United States Patent
Suiter

(10) Patent No.: US 10,380,693 B2
(45) Date of Patent: Aug. 13, 2019

(54) SYSTEMS AND METHODS FOR GENERATING DATA THAT IS REPRESENTATIVE OF AN INSURANCE POLICY FOR AN AUTONOMOUS VEHICLE

(71) Applicant: STATE FARM MUTUAL AUTOMOBILE INSURANCE COMPANY, Bloomington, IL (US)

(72) Inventor: Jerry Brett Suiter, Dacula, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/189,485

(22) Filed: Feb. 25, 2014

(65) Prior Publication Data
US 2015/0242953 A1 Aug. 27, 2015

(51) Int. Cl.
G06Q 40/08 (2012.01)
G07C 5/00 (2006.01)
G07C 5/08 (2006.01)

(52) U.S. Cl.
CPC ............. *G06Q 40/08* (2013.01); *G07C 5/008* (2013.01); *G07C 5/0866* (2013.01)

(58) Field of Classification Search
CPC ................................ G06Q 40/08; G06N 5/04
USPC .......................................................... 705/4
See application file for complete search history.

(56) References Cited

U.S. PATENT DOCUMENTS

| | | | | |
|---|---|---|---|---|
| 6,553,354 | B1* | 4/2003 | Hausner | G06F 17/18 706/1 |
| 6,754,485 | B1* | 6/2004 | Obradovich et al. | 455/414.1 |
| 6,987,964 | B2* | 1/2006 | Obradovich et al. | 340/425.5 |
| 7,142,844 | B2* | 11/2006 | Obradovich et al. | 455/414.1 |
| 7,319,848 | B2* | 1/2008 | Obradovich et al. | 455/99 |
| 7,409,221 | B2* | 8/2008 | Obradovich et al. | 455/457 |
| 8,538,498 | B2* | 9/2013 | Obradovich et al. | 455/575.9 |
| 8,595,037 | B1* | 11/2013 | Hyde et al. | 705/4 |
| 2004/0209601 | A1* | 10/2004 | Obradovich et al. | 455/414.1 |
| 2006/0079251 | A1* | 4/2006 | Obradovich et al. | 455/456.3 |
| 2006/0079252 | A1* | 4/2006 | Obradovich et al. | 455/456.3 |
| 2006/0116800 | A1* | 6/2006 | Obradovich et al. | 701/29 |

(Continued)

OTHER PUBLICATIONS

Woodyard et al. "Your Car May Be Invading Your Privacy" Mar. 25, 2013, USA Today.*

(Continued)

*Primary Examiner* — Kelly S Campen
(74) *Attorney, Agent, or Firm* — Marshall, Gerstein & Borun LLP; Randall G. Rueth

(57) ABSTRACT

Systems and methods for generating data representative of insurance coverage for autonomous vehicles are provided. In particular, systems and methods for generating data representative of insurance coverage for autonomous vehicles based on data representative of autonomous vehicle reliability are provided. The data representative of autonomous vehicle reliability may include data representative of the autonomous vehicle original equipment manufacturer test results, autonomous vehicle system manufacturer test results, autonomous vehicle system component manufacturer test results, insurance company autonomous vehicle, systems and/or component test results, and/or third party test results of the autonomous vehicle, systems and/or components.

20 Claims, 7 Drawing Sheets

(56) References Cited

U.S. PATENT DOCUMENTS

| | | | |
|---|---|---|---|
| 2006/0206576 A1* | 9/2006 | Obradovich et al. | 709/209 |
| 2006/0206577 A1* | 9/2006 | Obradovich et al. | 709/209 |
| 2006/0217849 A1* | 9/2006 | Obradovich et al. | 701/1 |
| 2006/0229778 A1* | 10/2006 | Obradovich et al. | 701/33 |
| 2009/0265193 A1* | 10/2009 | Collins et al. | 705/4 |
| 2013/0304513 A1* | 11/2013 | Hyde et al. | 705/4 |
| 2013/0304514 A1* | 11/2013 | Hyde et al. | 705/4 |
| 2014/0095214 A1* | 4/2014 | Mathe | G06Q 40/08 705/4 |
| 2014/0100889 A1* | 4/2014 | Tofte | 705/4 |
| 2014/0229286 A1* | 8/2014 | Obradovich et al. | 705/14.58 |
| 2015/0213540 A1* | 7/2015 | Wolfington | G06Q 30/0627 705/26.62 |

OTHER PUBLICATIONS

Campbell, Mark, et al. "Autonomous driving in urban environments: approaches, lessons and challenges." Philosophical Transactions of the Royal Society of London A: Mathematical, Physical and Engineering Sciences 368.1928 (2010): 4649-4672.*
Remenyte-Prescott, Rasa, John D. Andrews, and Paul Wai Hing Chung. "An efficient phased mission reliability analysis for autonomous vehicles." Reliability Engineering & System Safety 95.3 (2010): 226-235.*

* cited by examiner

SYSTEMS AND METHODS FOR GENERATING DATA THAT IS REPRESENTATIVE OF AN INSURANCE POLICY FOR AN AUTONOMOUS VEHICLE

TECHNICAL FIELD

The present disclosure generally relates to systems and methods for generating data representative of insurance coverage for autonomous vehicles. In particular, the present disclosure relates to systems and methods for generating data representative of insurance coverage for autonomous vehicles based on data representative of autonomous vehicle reliability.

BACKGROUND

Autonomous vehicles are being developed that are substantially automated or completely automated. Autonomous vehicles may operate with little or no input from a human. Because systems and components that are used to implement autonomous vehicle operation have a potential for failure, insurance policies that cover non-autonomous vehicles may not cover manufacturers and owners of the autonomous vehicles.

As a result, systems and methods are needed for generating data that is representative of insurance policies that cover autonomous vehicles. In particular, systems and methods are needed for generating data, that is representative of insurance policies for autonomous vehicles, that is based, at least in part, on data that is representative of autonomous vehicle reliability.

SUMMARY

A computer implemented method for generating data representative of an insurance policy for an autonomous vehicle may include acquiring, from one or more data sources, autonomous vehicle reliability data, wherein the autonomous vehicle reliability data is representative of reliability of the autonomous vehicle to operate autonomously. The method may further include acquiring, from one or more vehicle sensors, autonomous vehicle real-time operation data, wherein the autonomous vehicle real-time operation data is representative of real-time operation of the autonomous vehicle. The method may also include generating, using one or more processors, autonomous vehicle insurance data based on the autonomous vehicle reliability data and the autonomous vehicle real-time operation data, wherein the autonomous vehicle insurance data is representative of an insurance policy for the autonomous vehicle.

In another embodiment, a computer system for generating data representative of an insurance policy for an autonomous vehicle may include an autonomous vehicle reliability data acquisition module stored on a memory that, when executed by a processor, causes the processor to acquire, from one or more data sources, autonomous vehicle reliability data, wherein the autonomous vehicle reliability data is representative of reliability of the autonomous vehicle to operate autonomously. The computer system may also include an autonomous vehicle real-time data acquisition module stored on a memory that, when executed by a processor, causes the processor to acquire, from one or more vehicle sensors, autonomous vehicle real-time operation data, wherein the autonomous vehicle operation data is representative of real-time operation of the autonomous vehicle. The computer system may further include an autonomous vehicle insurance policy data generation module stored on a memory that, when executed by a processor, causes the processor to generate autonomous vehicle insurance data based on the autonomous vehicle reliability data and the autonomous vehicle real-time operation data, wherein the autonomous vehicle insurance data is representative of an insurance policy for the autonomous vehicle.

In yet a further embodiment, a non-transitory computer-readable memory storing instructions that, when executed by one or more processors, cause the one or more processors to generate data representative of an insurance policy for an autonomous vehicle may include an autonomous vehicle reliability data acquisition module that, when executed by a processor, causes the processor to acquire, from one or more data sources, autonomous vehicle reliability data, wherein the autonomous vehicle reliability data is representative of reliability of the autonomous vehicle to operate autonomously. The non-transitory computer-readable memory may further include an autonomous vehicle real-time data acquisition module that, when executed by a processor, causes the processor to acquire, from one or more vehicle sensors, autonomous vehicle real-time operation data, wherein the autonomous vehicle operation data is representative of real-time operation of the autonomous vehicle. The non-transitory computer-readable memory may also include an autonomous vehicle insurance policy data generation module that, when executed by a processor, causes the processor to generate autonomous vehicle insurance data based on the autonomous vehicle reliability data and the autonomous vehicle real-time operation data, wherein the autonomous vehicle insurance data is representative of an insurance policy for the autonomous vehicle.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

The systems and methods of the present disclosure may generate data representative of an insurance policy for an autonomous vehicle. The data representative of the insurance policy for the autonomous vehicle may be based on data that is representative of autonomous vehicle reliability, autonomous vehicle system reliability and/or autonomous vehicle system component reliability. The data representative of the insurance policy may be further based on real-time data that is representative of current operating conditions of the autonomous vehicle. For example, data representative of an insurance policy may reflect a first rate when the autonomous vehicle is operated in an automatic mode and reflect a second rate when the autonomous vehicle is operated in a manual mode. Similarly, real-time data related to autonomous vehicle status, autonomous vehicle system status and/or autonomous vehicle system component status may be used to generate a real-time rate.

Both manufacturer developed reliability data and reliability data obtained by an insurance company by testing associated autonomous vehicles may be used to determine an autonomous vehicle score. The autonomous vehicle score may, in turn, be used for underwriting individual autonomous vehicle insurance. Associated autonomous vehicle testing may be in accordance with testing performed by the national highway traffic safety administration (NHTSA), insurance companies and/or other third party vehicle testing. The autonomous vehicles may be subjected to tests that reflect everyday driving environments, as well as, crash testing to determine a vehicle score.

In addition, because autonomous vehicles may use sensors that are built into non-autonomous vehicles to avoid crashes and to move the non-autonomous vehicles from location to location, the same sensors may be used to provide real-time autonomous vehicle data to score an autonomous vehicle. Circumstances where autonomous vehicle system(s) are overridden may be recorded based on real-time autonomous vehicle data. Furthermore, real-time autonomous vehicle data may be used to identify software problems with an associated autonomous vehicle before the software problems cause an autonomous vehicle problem. Moreover, real-time data may be used to notify an insurance company of any accidents that an autonomous vehicle is involved. Real-time data may be, for example, wirelessly transmitted to the insurance company on a periodic basis, upon the occurrence of a particular event or whenever a WiFi connection is available.

Figure 1:
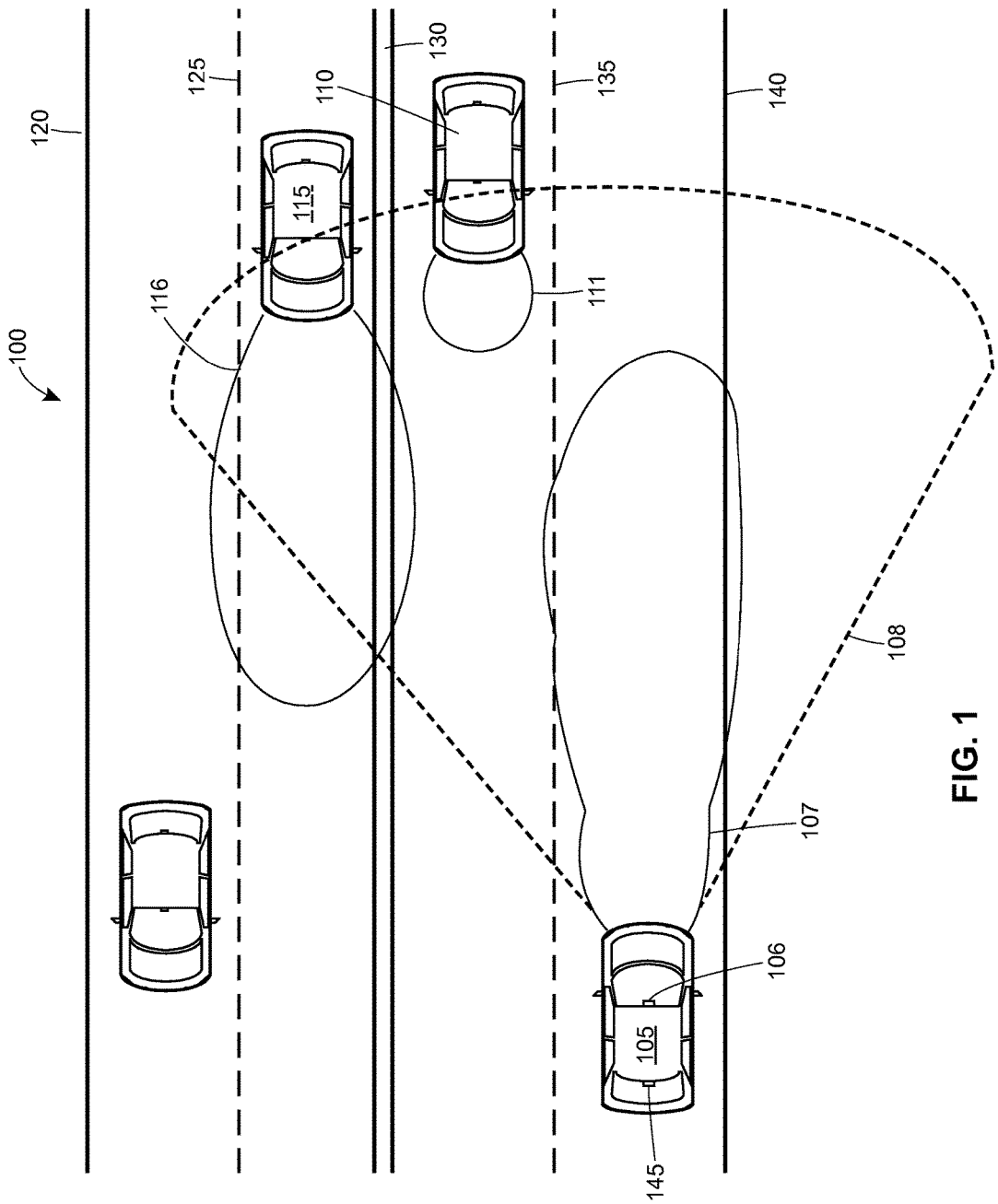
FIG. 1 depicts an example operating environment of an autonomous vehicle.

Turning to FIG. 1, an example four-lane highway operating environment 100 is depicted that illustrates an autonomous vehicle 105 driving in a right-hand lane 140, a leading vehicle 110 driving in a left-hand lane 135 and traveling in the same direction as the autonomous vehicle 105, and an oncoming vehicle 115 driving in a left-hand lane 125 and traveling in an opposite direction compared to the autonomous vehicle 105. As reflected in FIG. 1, other vehicles may be driving in a right-hand lane 120 and traveling in an opposite direction compared to the autonomous vehicle 105. As further reflected in FIG. 1, the lanes of traffic may be separated by a center-line 130. In any event, the autonomous vehicle may include forward sensor(s) 106 and rearward sensor(s) 145 that provide real-time data to an autonomous vehicle computer (not shown in FIG. 1) that is representative of the operating environment 100. For example, the forward sensor(s) 106 may provide data representative of objects directly in front of the autonomous vehicle 107 and/or data representative of objects (e.g., leading vehicle 110 and oncoming vehicle 115) in a broader field of view 108. The sensor(s) 106 may further provide real-time data that represents when the autonomous vehicle 105 is within danger zone 111 associated with the leading vehicle 110 or within a danger zone 116 associated with the oncoming vehicle 115.

Figure 2:
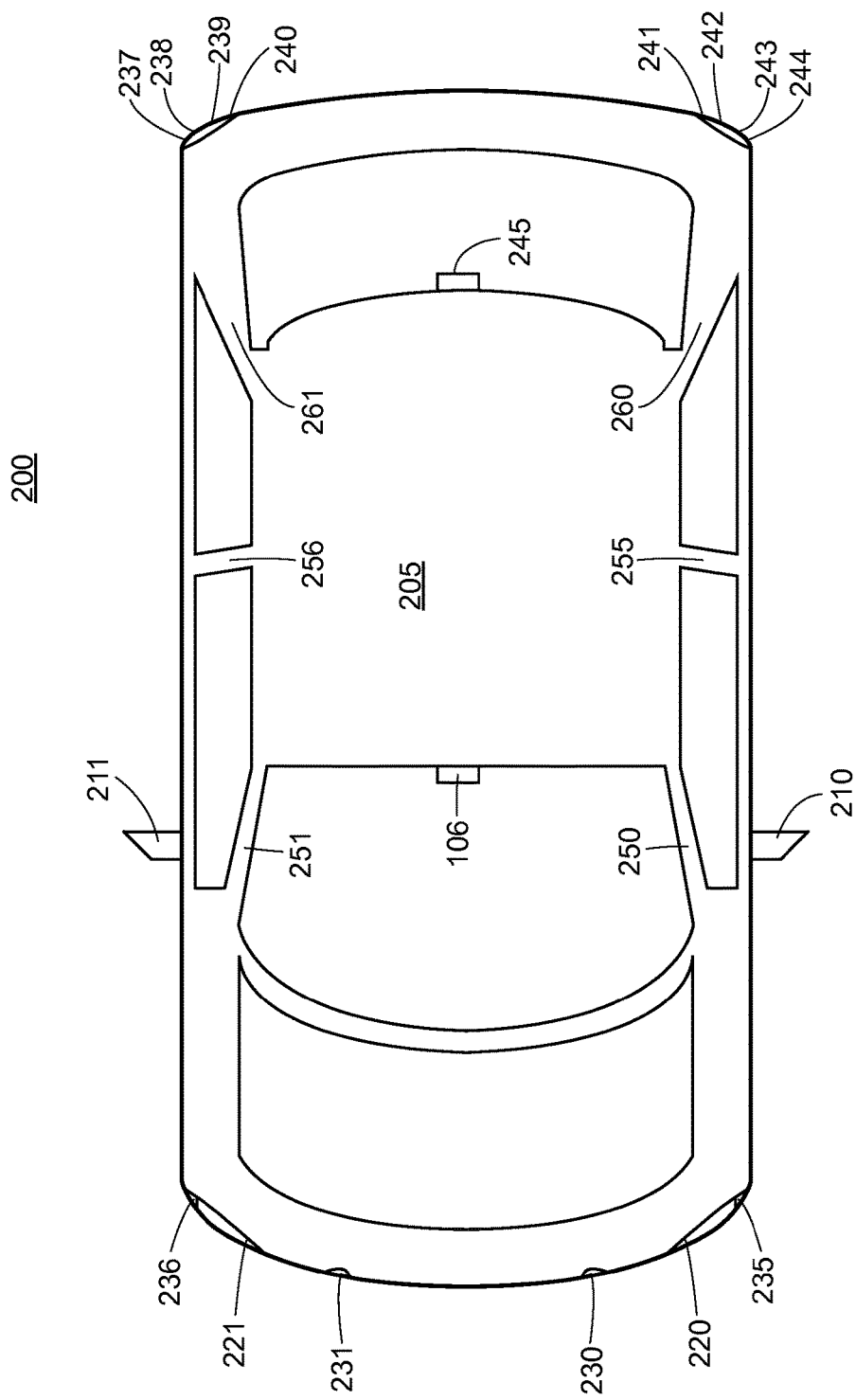
FIG. 2 depicts an example autonomous vehicle.

With reference to FIG. 2, a bird's eye view 100 of an autonomous vehicle 205 is depicted. The autonomous vehicle 205 may include forward sensor(s) in an interior rearview mirror 106, a driver side front headlight 220, a driver side front turn signal 235, a driver side front marker light 230, a passenger side front headlight 221, a passenger side front turn signal 236 and/or a passenger side front marker light 231. The autonomous vehicle may also include rearward sensor(s) in a center high-mounted stop light (CHMSL) 245, a driver side rear taillight 243, a driver side rear turn signal 244, a driver side rear marker light 242, a driver side rear backup light 241, a passenger side rear taillight 238, a passenger side rear turn signal 237, a passenger side rear marker light 240 and/or a passenger side rear backup light 239. The autonomous vehicle may further include driver side sensor(s) in a driver side exterior rearview mirror 210, a driver side A-pillar 250, a driver side B-pillar 255 and/or a driver side C-pillar 260. The autonomous vehicle may further include passenger side sensor(s) in a passenger side exterior rearview mirror 211, a passenger side A-pillar 251, a passenger side B-pillar 256 and/or a passenger side C-pillar 261. Any given autonomous vehicle may include additional, and/or alternate, sensor(s) in locations other than those specifically described with regard to FIG. 3. Furthermore, any one of the sensors 106, 220, 235, 230, 221, 236, 231, 245, 243, 244, 242, 241, 238, 237, 240, 239, 210, 250, 255, 260, 211, 251, 256, 261 may be an image sensor (e.g., a camera), an ultra-sonic sensor, an infrared sensor, an audio sensor (e.g., microphone), a pressure sensor, an autonomous vehicle autonomous mode sensor, an autonomous vehicle manual mode sensor, a vehicle speed sensors, a vehicle pitch sensor, a vehicle yaw sensors, a global positioning system sensor, an air bag activation sensor, a collision avoidance system sensor, or the like and may provide real-time autonomous vehicle operating data to an autonomous vehicle computer (not shown in FIG. 2).

Figure 3:
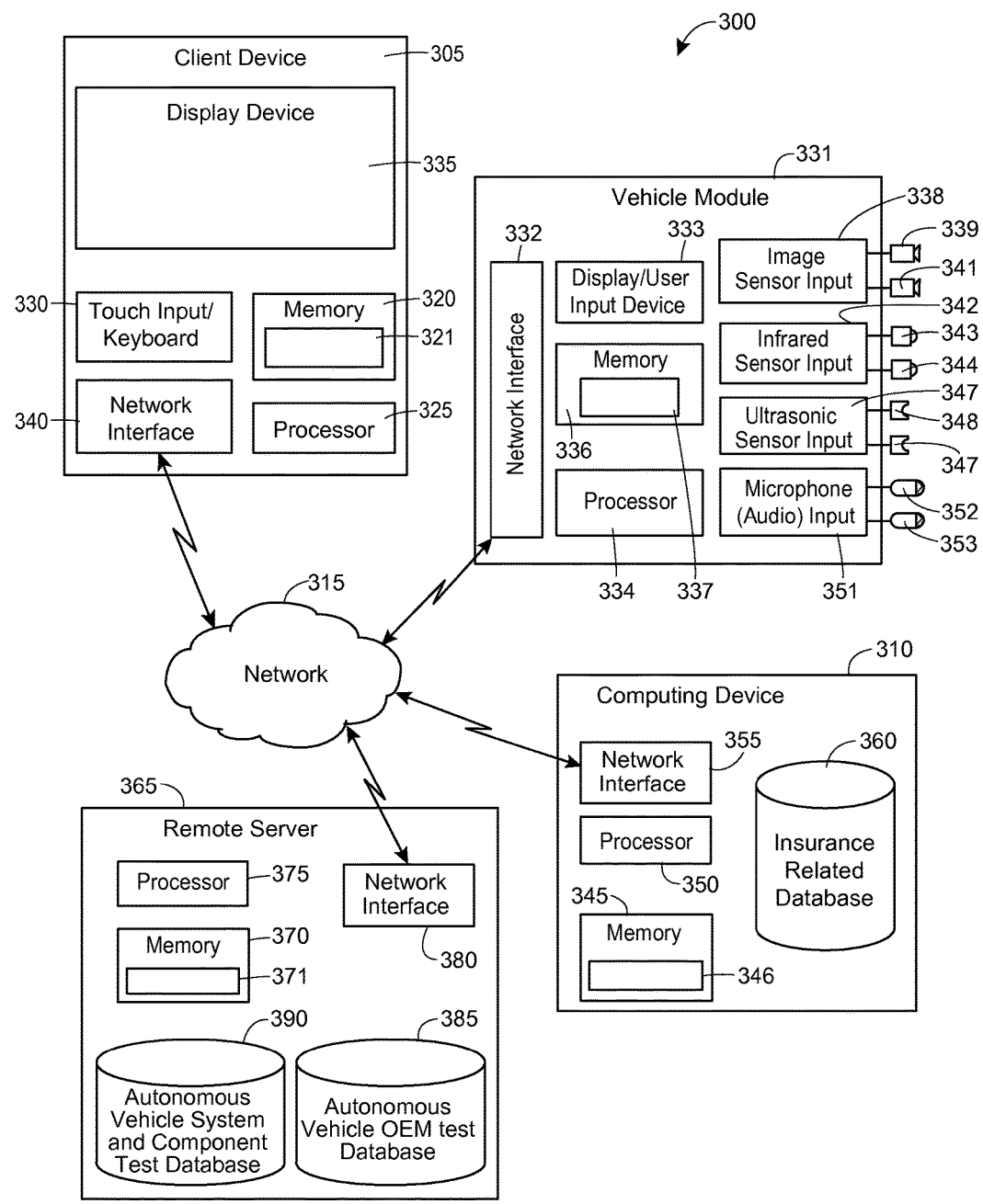
FIG. 3 depicts a block diagram of an example computer system for generating data representative of an insurance policy for an autonomous vehicle.

With reference to FIG. 3, a high-level block diagram of an autonomous vehicle insurance related data system 300 is illustrated that may implement communications between a vehicle module 331 (e.g., vehicle computer) and a remote computing device 310 to provide real-time autonomous vehicle operating data (e.g., data from any one of, or a combination of the sensors listed above) to the remote computing device 310 via a communication network 315.

For clarity, only one vehicle module 331 is depicted in FIG. 3. While FIG. 3 depicts only one vehicle module 331, it should be understood that any number of vehicle modules 331 may be supported. The vehicle module 331 may include a memory 336 and a processor 334 for storing and executing, respectively, a real-time autonomous vehicle module 337. The real-time autonomous vehicle module 337, stored in the memory 336 as a set of computer-readable instructions, may be related to an autonomous vehicle real-time operating data collecting application that, when executed on the processor 334, causes the processor 334 to store real-time autonomous vehicle operation data in the memory 336. Execution of the real-time autonomous vehicle module 337 may also cause the process 334 to transmit real-time autonomous vehicle data to the remote computing device 310. Execution of the real-time autonomous vehicle module 337 may further cause the processor 334 to associate the real-time autonomous vehicle data with a time and, or date.

Execution of the module 337 may further cause the processor 334 to communicate with the processor 375 of the remote server 365 via the network interface 380, the vehicle module communications network connection 332 and the communication network 315. Execution of the module 337 may further cause the processor 334 to communicate with the processor 325 of the remote data entry/reception device 305 via the network interface 340, the vehicle module communications network connection 332 and the communication network 315.

The vehicle module 331 may further include an image sensor input 338 communicatively connected to a first image sensor 339 and a second image sensor 341. While two image sensors 339, 341 are depicted in FIG. 3, any number of image sensors may be included within an autonomous vehicle system and may be located within an autonomous vehicle as described with regard to FIGS. 1 and 2. The vehicle module 331 may also include an infrared sensor input 342 communicatively connected to a first infrared sensor 343 and a second infrared sensor 344. While two infrared sensors 343, 344 are depicted in FIG. 3, any number of infrared sensors may be included within an autonomous vehicle system and may be located within an autonomous vehicle as described with regard to FIGS. 1 and 2. The vehicle module 331 may further include an ultrasonic sensor input 347 communicatively connected to a first ultrasonic sensor 348 and a second ultrasonic sensor 349. While two ultrasonic sensors 348, 349 are depicted in FIG. 3, any number of ultrasonic sensors may be included within an autonomous vehicle system and may be located within an autonomous vehicle as described with regard to FIGS. 1 and 2. The vehicle module 331 may also include a microphone input 351 communicatively connected to a first microphone 352 and a second microphone 353. While two microphones 352, 353 are depicted in FIG. 3, any number of microphones may be included within an autonomous vehicle system and may be located within an autonomous vehicle as described with regard to FIGS. 1 and 2. The vehicle module 331 may further include a display/user input device 333.

The network interface 332 may be configured to facilitate communications between the vehicle module 331, the remote data entry/reception device 305, the remote server 365 and/or the remote computing device 310 via any hard-wired or wireless communication network 315, including for example a wireless LAN, MAN or WAN, WiFi, the Internet, a Bluetooth connection, or any combination thereof. Moreover, the vehicle module 331 may be communicatively connected to the remote data entry/reception device 305, the remote server 365 and/or the remote computing device 310 via any suitable communication system, such as via any publicly available or privately owned communication network, including those that use wireless communication structures, such as wireless communication networks, including for example, wireless LANs and WANs, satellite and cellular telephone communication systems, etc. The vehicle module 331 may cause real-time autonomous vehicle operation data to be stored in a remote computing device 310 memory, a remote insurance related database 360, a remote data entry/reception device 305 memory 320, a remote server 365 memory 370, an autonomous vehicle system and component test database 390 and/or an autonomous vehicle original equipment manufacturer (OEM) test database 385.

The remote computing device 310 may include a memory 345 and a processor 350 for storing and executing, respectively, an autonomous vehicle insurance data generation module 346. The an autonomous vehicle insurance data generation module 346, stored in the memory 345 as a set of computer-readable instructions, facilitates applications related to collecting autonomous vehicle reliability data and/or autonomous vehicle real-time operating data and generation of autonomous vehicle insurance policy data. The an autonomous vehicle insurance data generation module 346 may also facilitate communications between the remote computing device 310, the remote server 365, the remote data entry/reception device 305 and/or the vehicle module 331 via a network interface 355 and the network 315 and other functions and instructions.

The remote server 365 may include a memory 370 and a processor 375 to store and execute, respectively, an autonomous vehicle reliability transmission module 371. The remote server 365 may be communicatively coupled to an autonomous vehicle system and component test database 390 and/or an autonomous vehicle original equipment manufacturer (OEM) test database 385. While the autonomous vehicle system and component test database 390 and the autonomous vehicle original equipment manufacturer (OEM) test database 385 are shown in FIG. 3 as being communicatively coupled to the remote server 365, it should be understood that the autonomous vehicle system and component test database 390 and/or the autonomous vehicle original equipment manufacturer (OEM) test database 385 may be located within separate remote servers (or any other suitable computing devices) communicatively coupled to the remote server 365. Optionally, portions of the autonomous vehicle system and component test database 390 and/or the autonomous vehicle original equipment manufacturer (OEM) test database 385 may be associated with memory modules that are separate from one another, such as a memory 345 of the remote computing device 310.

The data entry/reception device 305 may include a touch input/keyboard 330, a display device 335, a memory 320 and a processor 325 to store and execute, respectively, an autonomous vehicle insurance policy module 321 for entering data related to autonomous vehicles and associating the autonomous vehicles with a respective autonomous vehicle insurance policy. The processor 325, further executing the autonomous vehicle insurance policy module 321 may transmit data to, and/or receive data from, the vehicle module 331, the remote computing device 310 and/or the remote server 365.

Figure 4:
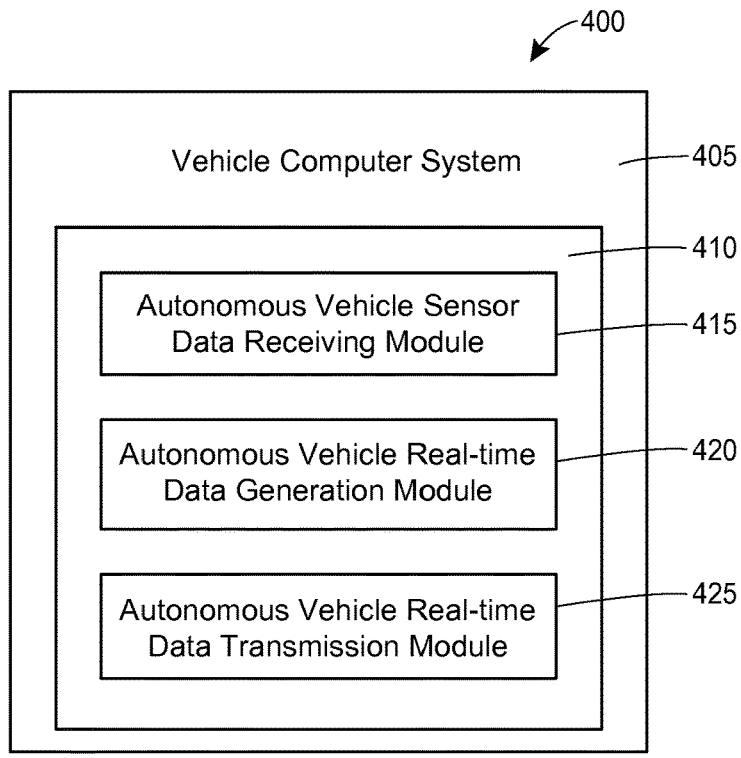
FIG. 4 depicts a block diagram of an example vehicle computer system for acquiring, analyzing and transmitting data representative of real-time operation of an autonomous vehicle of FIG. 2.
Figure 5:
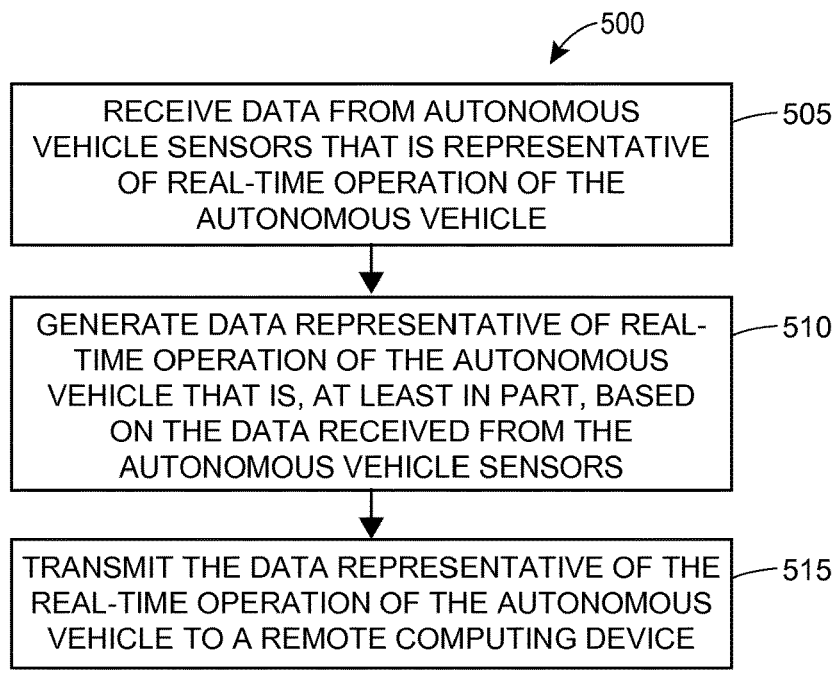
FIG. 5 depicts a flow diagram of an example method of acquiring, analyzing and transmitting data representative of real-time operation of an autonomous vehicle of FIG. 2.

Turning to FIGS. 4 and 5, a vehicle computer system 405 of an autonomous vehicle insurance related data system 400 is depicted along with a method of generating real-time autonomous vehicle data from the vehicle computer system 405 and, or transmitting real-time autonomous vehicle data to a remote computing device 310. The vehicle computer system 405 may be similar to the vehicle module 331 of FIG. 3. The method 500 may be implemented by executing the modules 415, 420, 425 on a processor (e.g., processor 334). In any event, the vehicle computer system 405 may include an autonomous vehicle sensor data receiving module 415, an autonomous vehicle real-time data generation module 420 and an autonomous vehicle real-time data transmission module 425 stored in a memory 410. The processor 334 may execute the autonomous vehicle sensor data receiving module 415 to, for example, cause the processor 334 to receive data from autonomous vehicle sensors (e.g., sensors 106, 220, 235, 230, 221, 236, 231, 245, 243, 244, 242, 241, 238, 237, 240, 239, 210, 250, 255, 260, 211, 251, 256, 261 of FIG. 2) (block 505).

The processor 334 may execute the autonomous vehicle real-time data generation module 420 to generate data representative of real-time operation of the autonomous vehicle that is, at least in part, based on the data received from the autonomous vehicle sensors (block 510). For example, the processor 334 may generate real-time autonomous vehicle data indicating that the autonomous vehicle is currently operating in an autonomous mode. Alternatively, the processor 334 may generate real-time autonomous vehicle data indicating that the autonomous vehicle is currently operating in a manual mode. The processor 334 may also associate a time and/or day with the real-time data. As another example, the processor 334 may generate real-time autonomous vehicle data indicating that a particular vehicle system and/or component is currently malfunctioning.

The processor 334 may execute the autonomous vehicle real-time data transmission module 425 to transmit the data representative of the real-time operation of the autonomous vehicle to a remote computing device (e.g., remote computing device 310 of FIG. 3) (block 515). In addition, the processor 334 may further execute the autonomous vehicle real-time data transmission module 425 to transmit the data representative of the real-time operation of the autonomous vehicle to a remote server (e.g., remote server 365 of FIG. 3) (block 515).

Figure 6:
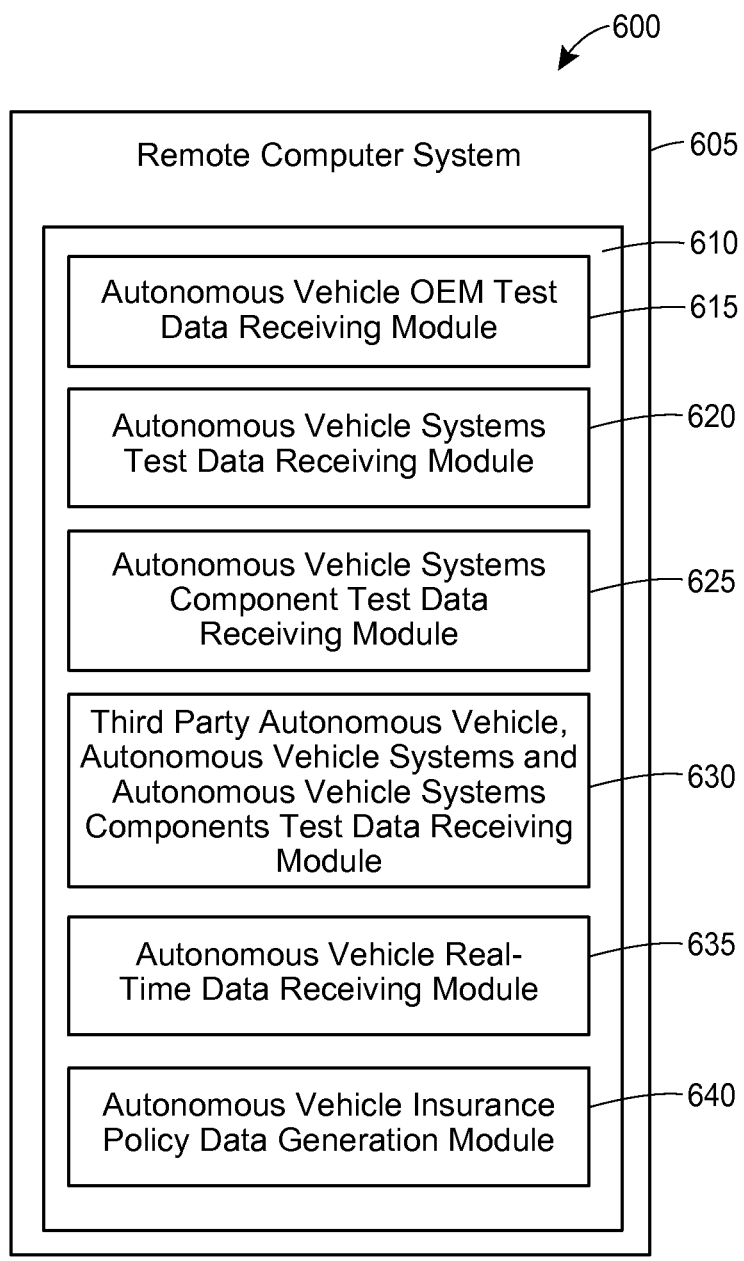
FIG. 6 depicts a block diagram of an example remote computer system for use in generating data representative of an insurance policy for an autonomous vehicle of FIG. 2.
Figure 7:
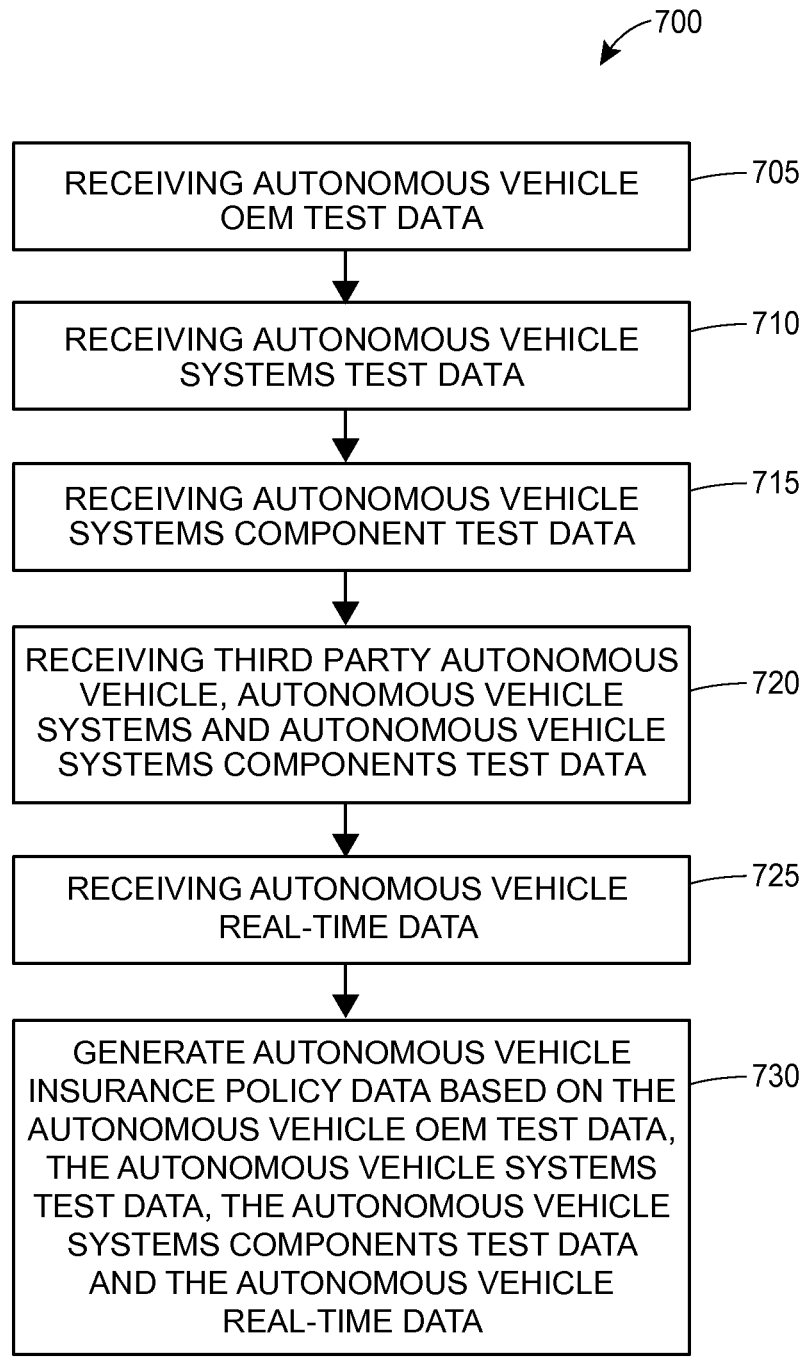
FIG. 7 depicts a flow diagram of an example method of generating data representative of an insurance policy for an autonomous vehicle of FIG. 2.
Figure 8:
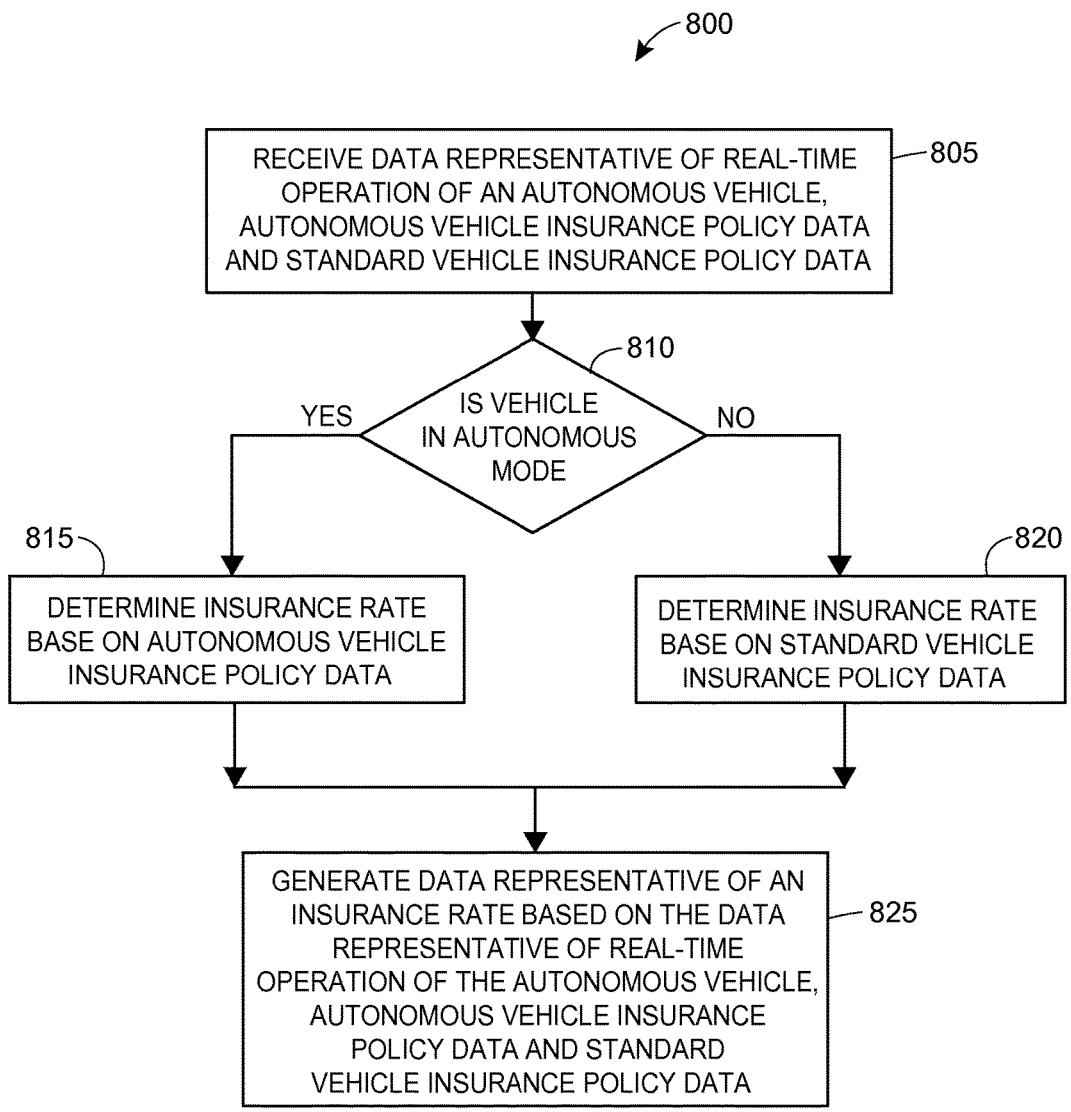
FIG. 8 depicts a flow diagram of an example method of generating data representative of an insurance bill for an autonomous vehicle of FIG. 2.

Turning to FIGS. 6, 7 and 8, a computer system 605 of an autonomous vehicle insurance related data system 600 is depicted along with a method of generating autonomous vehicle insurance policy data 700 and a method of generating data representative of an insurance bill 800. The remote computer system 605 may be similar to the remote computing device 310 of FIG. 3. The method 700 may be implemented by executing the modules 615, 620, 625, 630, 635, 640 on a processor (e.g., processor 350). In any event, the remote computer system 605 may include an autonomous vehicle original equipment manufacturer (OEM) test data receiving module 615, an autonomous vehicle systems test data receiving module 620, an autonomous vehicle systems component test data receiving module 625, a third party autonomous vehicle, autonomous vehicle systems and autonomous vehicle systems components test data receiving module 630, an autonomous vehicle real-time data receiving module 635 and an autonomous vehicle insurance policy data generation module 640 stored on a memory 610. The processor 350 may execute the autonomous vehicle original equipment manufacturer (OEM) test data receiving module 615 to receive autonomous vehicle OEM test data (block 705). For example, the processor 350 may execute the autonomous vehicle original equipment manufacturer (OEM) test data receiving module 615 to receive autonomous vehicle OEM test data from the autonomous vehicle OEM test database 385 (block 705).

The processor 350 may execute the autonomous vehicle systems test data receiving module 620 to receive autonomous vehicle systems test data (block 710). For example, the processor 350 may execute the autonomous vehicle systems test data receiving module 620 to receive autonomous vehicle systems test data from the autonomous vehicle system and component test database 390 (block 710).

The processor 350 may execute the autonomous vehicle systems component test data receiving module 625 to receive autonomous vehicle systems component test data (block 715). For example, the processor 350 may execute the autonomous vehicle systems component test data receiving module 625 to receive autonomous vehicle systems component test data from the autonomous vehicle system and component test database 390 (block 715).

The processor 350 may execute the third party autonomous vehicle, autonomous vehicle systems and autonomous vehicle systems components test data receiving module 630 to receive third party autonomous vehicle, autonomous vehicle system and autonomous vehicle system component test data (block 720). For example, the processor 350 may execute the third party autonomous vehicle, autonomous vehicle systems and autonomous vehicle systems components test data receiving module 630 to receive third party autonomous vehicle, autonomous vehicle system and autonomous vehicle system component test data from the autonomous vehicle system and component test database 390 (block 720).

The processor 350 may execute the autonomous vehicle real-time data receiving module 635 to receive autonomous vehicle real-time data (block 725). For example, the processor 350 may execute the autonomous vehicle real-time data receiving module 635 to receive autonomous vehicle real-time data from the vehicle computer system 405 (block 725).

The processor 350 may execute the autonomous vehicle insurance policy data generation module 640 to generate autonomous vehicle insurance policy data based on autonomous vehicle reliability data (block 730). For example, the processor 350 may execute the autonomous vehicle insurance policy data generation module 640 to generate autonomous vehicle insurance policy data based on the autonomous vehicle OEM test data, the autonomous vehicle systems test data, the autonomous vehicle systems components test data and/or the autonomous vehicle real-time data (block 730).

The processor 350 may further execute the autonomous vehicle real-time data receiving module 640 and/or the autonomous vehicle insurance policy generation module 640 to receive data representative of real-time operation of an autonomous vehicle, autonomous vehicle insurance policy data and non-autonomous vehicle insurance policy data (block 805). The processor 350 may determine whether an autonomous vehicle (e.g., autonomous vehicle 105 of FIG. 1) is currently in an autonomous mode based on the real-time autonomous vehicle operation data (block 810). When the processor 350 determines that the autonomous vehicle 105 is currently operating in an autonomous mode (block 810), the processor 350 may determine an insurance rate based on the autonomous vehicle insurance policy data (block 815). The processor 350 may further track an amount of time that the autonomous vehicle 105 is operated in the autonomous mode (block 815).

When the processor 350 determines that the autonomous vehicle 105 is currently operating in a manual mode (block 810), the processor 350 may determine an insurance rate based on the non-autonomous vehicle insurance policy data (block 820). The processor 350 may further track an amount of time that the autonomous vehicle 105 is operated in the manual mode (block 815).

The processor 350 may generate data representative of an insurance bill based on the data representative of real-time operation of the autonomous vehicle (e.g., the amount of time the autonomous vehicle 105 is operated in autonomous mode and the amount of time the autonomous vehicle 105 is operated in manual mode), the autonomous vehicle insurance policy data and the non-autonomous vehicle insurance policy data (block 825). It should be understood, that the autonomous vehicle 105 insurance policy data may be updated in real-time based on the real-time data representative of the current operation of the autonomous vehicle 105. For example, the insurance rate may increase if the real-time data indicates that the autonomous vehicle 105 is speeding or that the autonomous vehicle 105 has a malfunctioning system or component. The processor 334 may generate a warning and/or indicator to advise a driver of the autonomous vehicle 105 is such a circumstance.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implemented method for generating data representative of an insurance policy for a particular autonomous vehicle based on a reliability of the particular autonomous vehicle, the method comprising:

acquiring, from an autonomous vehicle original equipment manufacturer test database, autonomous vehicle reliability data, wherein the autonomous vehicle reliability data is representative of reliability of associated autonomous vehicles to operate autonomously, and wherein the autonomous vehicle reliability data is at least partially based on tests performed by an original equipment manufacturer;

acquiring, from an autonomous vehicle system and component test database, autonomous vehicle system and component reliability data, wherein the autonomous vehicle system and component reliability data is representative of reliability of associated autonomous vehicle systems and components to operate autonomously, and wherein the autonomous vehicle systems and components reliability data is at least partially based on tests performed by at least one of: an autonomous vehicle system manufacture or an autonomous vehicle component manufacture;

acquiring, from a third party autonomous vehicle, autonomous vehicle systems and autonomous vehicle systems components test database, third party test data, wherein the third party test data is at least partially based on tests performed by a third party on at least one of: an autonomous vehicle, an autonomous vehicle system, or an autonomous vehicle system component;

acquiring, from one or more vehicle sensors, autonomous vehicle real-time operation data, wherein the autonomous vehicle real-time operation data is representative of real-time operation of the autonomous vehicle and whether at least one of: the particular autonomous vehicle is currently operating in an autonomous mode, a particular vehicle system is currently malfunctioning, or a component is currently malfunctioning;

determining a reliability of a particular autonomous vehicle based on the autonomous vehicle reliability data, the autonomous vehicle system and component reliability data, the third party test data, and the autonomous vehicle real-time operation data;

generating a warning, based on the reliability of the particular autonomous vehicle, to indicate at least one of: an autonomous vehicle speed, a malfunctioning system or malfunctioning component, to advise a driver of the autonomous vehicle that an insurance rate for the driver will increase due to of the at least one of: the autonomous vehicle speed, the malfunctioning system or the malfunctioning component;

determining whether the particular autonomous vehicle is being operated in autonomous operation mode based on the autonomous vehicle real-time operation data;

generating, in real-time, insurance policy data for the particular autonomous vehicle based on standard insurance policy data when the particular autonomous vehicle is determined to not be operating in autonomous mode, wherein an insurance rate increases when at least one of: the real-time data indicates that the autonomous vehicle has a malfunctioning system, or the autonomous vehicle has a malfunctioning component; and generating, in real-time, insurance policy data for the particular autonomous vehicle based on the reliability of the particular autonomous vehicle when the particular autonomous vehicle is determined to be operating in autonomous mode, wherein the insurance rate increases when at least one of: the real-time data indicates that the autonomous vehicle has a malfunctioning system, or the autonomous vehicle has a malfunctioning component.

2. The method of claim 1, wherein acquiring the autonomous vehicle reliability data includes acquiring autonomous vehicle reliability data from at least one of: an original equipment manufacture of the autonomous vehicle, an original equipment manufacture of a system of the autonomous vehicle, an original equipment manufacture of a system component of the autonomous vehicle, a national highway safety administration, a third-party testing organization, or an insurance company.

3. The method of claim 1, wherein the autonomous vehicle real-time operation data is indicative of a length of time the autonomous vehicle was operated in the autonomous mode and the insurance policy data is further based on the length of time the autonomous vehicle was operated in the autonomous mode.

4. The method of claim 1, wherein acquiring the autonomous vehicle real-time operation data includes acquiring autonomous vehicle real-time data from at least one of: a sensor built into the autonomous vehicle to avoid crashes, an infrared sensor, an ultrasonic sensor, an audio sensor, a pressure sensor, an image sensor, a sensor indicative of whether the autonomous vehicle is currently being operated in an autonomous mode, a sensor indicative of whether the autonomous vehicle was involved in an accident, or a sensor indicative of whether the autonomous vehicle is currently being operated in a manual mode.

5. The method of claim 1, further comprising:

determining, using one or more processors, that the autonomous vehicle is currently being operated in an autonomous mode;

generating, using one or more processors, autonomous vehicle insurance data based on the autonomous vehicle reliability, wherein the autonomous vehicle insurance data is representative of an insurance policy for the autonomous vehicle; and generating data representative of an insurance bill based on the data representative of the insurance policy for the autonomous vehicle.

6. The method of claim 1, further comprising:

receiving, using one or more processors, data representative of a non-autonomous vehicle insurance policy; and determining, using one or more processors, that the autonomous vehicle is currently being operated in a manual mode and generating data representative of an insurance bill based on the data representative of the non-autonomous vehicle insurance policy.

7. A computer system for generating data representative of an insurance policy for a particular autonomous vehicle based on a reliability of the particular autonomous vehicle, the computer system comprising:

an autonomous vehicle reliability data acquisition module stored on a non-transitory computer-readable memory that, when executed by a processor, causes the processor to acquire, from an autonomous vehicle original equipment manufacturer test database, autonomous vehicle reliability data, wherein the autonomous vehicle reliability data is representative of reliability of associated autonomous vehicles to operate autonomously;

an autonomous vehicle system and component reliability data acquisition module stored on a non-transitory computer-readable memory that, when executed by a processor, causes the processor to acquire, from an autonomous vehicle system and component test database, autonomous vehicle system and component reliability data, wherein the autonomous vehicle system and component reliability data is representative of reliability of associated autonomous vehicle systems and components to operate autonomously, and wherein the autonomous vehicle system and component reliability data is at least partially based on tests performed by at least one of: an autonomous vehicle system manufacture or an autonomous vehicle component manufacture;

a third party test data acquisition module stored on a non-transitory computer-readable memory that, when executed by a processor, causes the processor to acquire, from a third party autonomous vehicle, autonomous vehicle systems and autonomous vehicle systems components test database, third party test data, wherein the third party test data is at least partially based on tests performed by a third party on at least one of: an autonomous vehicle, a component of an autonomous vehicle system, or an autonomous vehicle system;

an autonomous vehicle real-time data acquisition module stored on a non-transitory computer-readable memory that, when executed by a processor, causes the processor to acquire, from one or more vehicle sensors, autonomous vehicle real-time operation data wherein the autonomous vehicle operation data is representative of real-time operation of the autonomous vehicle and whether at least one of: the particular autonomous vehicle is currently operating in an autonomous mode, a particular vehicle system is currently malfunctioning, or a component is currently malfunctioning;

an autonomous vehicle reliability determination module stored on a non-transitory computer-readable memory that, when executed by a processor, causes the processor to determine a reliability for a particular autonomous vehicle based, at least in part, on the autonomous vehicle reliability data and the autonomous vehicle real-time operation data;

an autonomous vehicle diver warning module stored on a non-transitory computer-readable memory that, when executed by a processor, causes the processor to generate a warning, based on the reliability of the particular autonomous vehicle, to indicate at least one of: a malfunctioning system or malfunctioning component, to advise a driver of the autonomous vehicle that an insurance rate for the driver will increase based on at least one of: the malfunctioning system or the malfunctioning component;

an autonomous vehicle operation mode determination module stored on a non-transitory computer-readable memory that, when executed by a processor, causes the processor to determine whether the particular autonomous vehicle is being operated in autonomous operation mode based on the autonomous vehicle real-time operation data; and an autonomous vehicle insurance policy data generation module stored on a non-transitory computer-readable memory that, when executed by a processor, causes the processor to generate, in real-time, insurance policy data for the particular autonomous vehicle based on the reliability of the particular autonomous vehicle when the particular autonomous vehicle is determined to be operating in autonomous mode, and based on standard insurance policy data when the particular autonomous vehicle is determined to not be operating in autonomous mode, wherein an insurance rate increases when at least one of: the real-time data indicates that the autonomous vehicle has a malfunctioning system, or the autonomous vehicle has a malfunctioning component.

8. The computer system of claim 7, wherein the autonomous vehicle reliability data is received from at least one of: an original equipment manufacture of the autonomous vehicle, an original equipment manufacture of a system of the autonomous vehicle, an original equipment manufacture of a system component of the autonomous vehicle, a national highway safety administration, a third-party testing organization, or an insurance company.

9. The computer system of claim 7, wherein the autonomous vehicle real-time operation data is indicative of a length of time the autonomous vehicle was operated in the autonomous mode and the insurance policy data is further based on the length of time the autonomous vehicle was operated in the autonomous mode.

10. The computer system of claim 7, further comprising:
an autonomous vehicle real-time data acquisition and transmission module stored on a non-transitory computer-readable memory that, when executed by a processor, causes the processor acquire and transmit autonomous vehicle real-time operation data from a vehicle computer to a remote computer, wherein the processor acquires the autonomous vehicle real-time operation data from at least one of: a sensor built into the autonomous vehicle to avoid crashes, an infrared sensor, an ultrasonic sensor, an audio sensor, a pressure sensor, an image sensor, a sensor indicative of whether the autonomous vehicle is currently being operated in an autonomous mode, a sensor indicative of whether the autonomous vehicle was involved in an accident, or a sensor indicative of whether the autonomous vehicle is currently being operated in a manual mode.

11. The computer system of claim 7, further comprising:
an autonomous vehicle insurance policy data generation module stored on a non-transitory computer-readable memory that, when executed by a processor, causes the processor to generate autonomous vehicle insurance data based on the autonomous vehicle reliability, wherein the autonomous vehicle insurance data is representative of an insurance policy for the autonomous vehicle; and
an autonomous vehicle operation mode determination module stored on a non-transitory computer-readable memory that, when executed by a processor, causes the processor to determine that the autonomous vehicle is currently being operated in an autonomous mode and causes the processor to generate data representative of an insurance bill based on the data representative of the insurance policy for the autonomous vehicle.

12. The computer system of claim 7, further comprising:
a non-autonomous vehicle insurance policy data acquisition module stored on a non-transitory computer-readable memory that, when executed by a processor, causes the processor to receive data representative of a non-autonomous vehicle insurance policy, causes the processor to determine that the autonomous vehicle is currently being operated in a manual mode and causes the processor to generate data representative of an insurance bill based on the data representative of the non-autonomous vehicle insurance policy.

13. The computer system of claim 12, further comprising:
an autonomous vehicle insurance policy data generation module stored on a non-transitory computer-readable memory that, when executed by a processor, causes the processor to generate autonomous vehicle insurance data based on the autonomous vehicle reliability, wherein the autonomous vehicle insurance data is representative of an insurance policy for the autonomous vehicle; and
an autonomous vehicle operation mode determination module stored on a non-transitory computer-readable memory that, when executed by a processor, causes the processor to determine that the autonomous vehicle is currently being operated in an autonomous mode and causes the processor to generate data representative of an insurance bill based on the data representative of the insurance policy for the autonomous vehicle and the data representative of the non-autonomous vehicle insurance policy.

14. A non-transitory computer-readable memory storing instructions that, when executed by one or more processors, cause the one or more processors to generate data representative of an insurance policy for a particular autonomous vehicle based on a reliability of the particular autonomous vehicle, the non-transitory computer-readable memory comprising:
an autonomous vehicle reliability data acquisition module that, when executed by a processor, causes the processor to acquire, from an autonomous vehicle original equipment manufacturer test database, autonomous vehicle reliability data, wherein the autonomous vehicle reliability data is representative of reliability of associated autonomous vehicles to operate autonomously;
an autonomous vehicle system and component reliability data acquisition module that, when executed by a processor, causes the processor to acquire, from an autonomous vehicle system and component test database, autonomous vehicle system and component reliability data, wherein the autonomous vehicle system and component reliability data is representative of reliability of associated autonomous vehicle systems and components to operate autonomously, and wherein the autonomous vehicle system and component reliability data is at least partially based on tests performed by at least one of: an autonomous vehicle system manufacture or an autonomous vehicle component manufacture;
a third party test data acquisition module that, when executed by a processor, causes the processor to acquire, from a third party autonomous vehicle, autonomous vehicle systems and autonomous vehicle systems components test database, third party test data, wherein the third party test data is at least partially based on tests performed by a third party on at least one of: an autonomous vehicle, a component of an autonomous vehicle system, or an autonomous vehicle system;
an autonomous vehicle real-time data acquisition module that, when executed by a processor, causes the processor to acquire, from one or more vehicle sensors, autonomous vehicle real-time operation data, wherein the autonomous vehicle real-time operation data is representative of real-time operation of the autonomous vehicle and whether at least one of: the autonomous vehicle is currently speeding, a particular vehicle system is currently malfunctioning, or a component is currently malfunctioning;
an autonomous vehicle reliability determination module that, when executed by a processor, causes the processor to determine a reliability of a particular autonomous vehicle based on the autonomous vehicle reliability data, the autonomous vehicle system and component reliability data, and the autonomous vehicle real-time operation data;
an autonomous vehicle diver warning module that, when executed by a processor, causes the processor to generate a warning, based on the reliability of the particular autonomous vehicle, to indicate at least one of: an autonomous vehicle speed, a malfunctioning system or malfunctioning component, to advise a driver of the autonomous vehicle that an insurance rate for the driver will increase based on at least one of: the autonomous vehicle speed, the malfunctioning system or the malfunctioning component;
an autonomous vehicle operation mode determination module that, when executed by a processor, causes the processor to determine whether the particular autonomous vehicle is being operated in autonomous operation mode based on the autonomous vehicle real-time operation data; and
an autonomous vehicle insurance policy data generation module that, when executed by a processor, causes the processor to generate, in real-time, insurance policy data for the particular autonomous vehicle based on the reliability of the particular autonomous vehicle when the particular autonomous vehicle is determined to be operating in autonomous mode, and based on standard insurance policy data when the particular autonomous vehicle is determined to not be operating in autonomous mode, wherein an insurance rate increases when at least one of: the real-time data indicates that the autonomous vehicle is currently speeding, the autonomous vehicle has a malfunctioning system, or the autonomous vehicle has a malfunctioning component.

15. The non-transitory computer-readable memory of claim 14, wherein the autonomous vehicle reliability data is received from at least one of: an original equipment manufacture of the autonomous vehicle, an original equipment manufacture of a system of the autonomous vehicle, an original equipment manufacture of a system component of the autonomous vehicle, a national highway safety administration, a third-party testing organization, or an insurance company.

16. The non-transitory computer-readable memory of claim 14, wherein the autonomous vehicle real-time operation data is indicative of a length of time the autonomous vehicle was operated in the autonomous mode and the insurance policy data is further based on the length of time the autonomous vehicle was operated in the autonomous mode.

17. The non-transitory computer-readable memory of claim 14, further comprising:
an autonomous vehicle real-time data acquisition and transmission module that, when executed by a processor, causes the processor acquire and transmit autonomous vehicle real-time operation data from a vehicle computer to a remote computer, wherein the processor acquires the autonomous vehicle real-time operation data from at least one of: a sensor built into the autonomous vehicle to avoid crashes, an infrared sensor, an ultrasonic sensor, an audio sensor, a pressure sensor, an image sensor, a sensor indicative of whether the autonomous vehicle is currently being operated in an autonomous mode, a sensor indicative of whether the autonomous vehicle was involved in an accident, or a sensor indicative of whether the autonomous vehicle is currently being operated in a manual mode.

18. The non-transitory computer-readable memory of claim 14, further comprising:
an autonomous vehicle insurance policy data generation module that, when executed by a processor, causes the processor to generate autonomous vehicle insurance data based on the autonomous vehicle reliability, wherein the autonomous vehicle insurance data is representative of an insurance policy for the autonomous vehicle; and
an autonomous vehicle operation mode determination module that, when executed by a processor, causes the processor to determine that the autonomous vehicle is currently being operated in an autonomous mode and causes the processor to generate data representative of an insurance bill based on the data representative of the insurance policy for the autonomous vehicle.

19. The non-transitory computer-readable memory of claim 14, further comprising:
a non-autonomous vehicle insurance policy data acquisition module that, when executed by a processor, causes the processor to receive data representative of a non-autonomous vehicle insurance policy, causes the processor to determine that the autonomous vehicle is currently being operated in a manual mode and causes the processor to generate data representative of an insurance bill based on the data representative of the non-autonomous vehicle insurance policy.

20. The non-transitory computer-readable memory of claim 19, further comprising:
an autonomous vehicle insurance policy data generation module that, when executed by a processor, causes the processor to generate autonomous vehicle insurance data based on the autonomous vehicle reliability, wherein the autonomous vehicle insurance data is representative of an insurance policy for the autonomous vehicle; and
an autonomous vehicle operation mode determination module that, when executed by a processor, causes the processor to determine that the autonomous vehicle is currently being operated in an autonomous mode and causes the processor to generate data representative of an insurance bill based on the data representative of the insurance policy for the autonomous vehicle and the data representative of the non-autonomous vehicle insurance policy.

* * * * *